United States Patent
Tsuchiya et al.

(10) Patent No.: US 9,893,395 B2
(45) Date of Patent: Feb. 13, 2018

(54) BATTERY COOLING STRUCTURE

(71) Applicant: TOYOTA JIDOSHA KABUSHIKI KAISHA, Toyota-shi, Aichi-ken (JP)

(72) Inventors: Takenori Tsuchiya, Toyota (JP); Shogo Yoneda, Okazaki (JP); Ryuichi Oomuta, Okazaki (JP); Tetsuo Watanabe, Okazaki (JP); Yosuke Maruta, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/031,571

(22) PCT Filed: Oct. 14, 2014

(86) PCT No.: PCT/IB2014/002086
§ 371 (c)(1),
(2) Date: Apr. 22, 2016

(87) PCT Pub. No.: WO2015/063555
PCT Pub. Date: May 7, 2015

(65) Prior Publication Data
US 2016/0261011 A1 Sep. 8, 2016

(30) Foreign Application Priority Data
Oct. 31, 2013 (JP) ................................ 2013-227421

(51) Int. Cl.
*H01M 10/6565* (2014.01)
*B60L 11/18* (2006.01)
(Continued)

(52) U.S. Cl.
CPC ..... *H01M 10/6565* (2015.04); *B60L 11/1874* (2013.01); *H01M 2/1077* (2013.01);
(Continued)

(58) Field of Classification Search
CPC .......... H01M 10/6563; H01M 10/613; H01M 10/625; H01M 2/1077; H01M 10/6565;
(Continued)

(56) References Cited

U.S. PATENT DOCUMENTS

2001/0030069 A1 10/2001 Misu et al.
2004/0232891 A1* 11/2004 Kimoto ............... H01M 2/1077
320/150
(Continued)

FOREIGN PATENT DOCUMENTS

CN 101340013 A 1/2009
CN 203592887 U 5/2014
(Continued)

OTHER PUBLICATIONS

[JP2002_134084 MT.*
(Continued)

Primary Examiner — Alex Usyatinsky
(74) Attorney, Agent, or Firm — Sughrue Mion, PLLC

(57) ABSTRACT

The invention relates to a battery cooling structure for cooling a battery mounted in a vehicle. This battery cooling structure includes a battery pack (20) within which the battery is housed in an internal space; an air supplying device (26) that is configured to send cooling air to the battery pack (20); and an air exhausting device (30) is configured to discharge exhaust air from the battery pack (20). The battery pack (20) is arranged under a rear seat (10) of the vehicle. An exhaust vent (54) of the air exhausting device 30) is provided on a floor surface in a rearward space behind the rear seat (10) in the vehicle, and discharges the exhaust air from the battery pack (20) upward into the rearward space from the exhaust vent (54) provided in the floor surface.

5 Claims, 4 Drawing Sheets

(51) Int. Cl.
*H01M 2/10* (2006.01)
*H01M 10/625* (2014.01)
*H01M 10/613* (2014.01)
*H01M 10/647* (2014.01)

(52) U.S. Cl.
CPC ....... *H01M 10/613* (2015.04); *H01M 10/625* (2015.04); *H01M 10/647* (2015.04); *H01M 2220/20* (2013.01); *Y02T 10/7005* (2013.01); *Y02T 10/705* (2013.01)

(58) Field of Classification Search
CPC . H01M 2220/20; B60L 11/18; B60L 11/1874; B60K 11/06; B60K 11/08; B60K 1/04; B60K 2001/005
See application file for complete search history.

(56) References Cited

U.S. PATENT DOCUMENTS

| | | | |
|---|---|---|---|
| 2005/0029870 A1* | 2/2005 | Aridome | B60K 6/445 307/10.1 |
| 2005/0138941 A1 | 6/2005 | Kikuchi | |
| 2008/0196957 A1 | 8/2008 | Koike et al. | |
| 2008/0296075 A1* | 12/2008 | Zhu | B60K 1/04 180/68.1 |
| 2010/0089675 A1* | 4/2010 | Nagata | B60K 1/04 180/68.5 |
| 2012/0118655 A1 | 5/2012 | Ogihara et al. | |
| 2012/0267178 A1 | 10/2012 | Watanabe | |
| 2013/0071719 A1 | 3/2013 | Chung et al. | |
| 2014/0182957 A1 | 7/2014 | Honda et al. | |
| 2015/0010795 A1 | 1/2015 | Tanigaki et al. | |
| 2015/0343891 A1 | 12/2015 | Honda et al. | |

FOREIGN PATENT DOCUMENTS

| | | | |
|---|---|---|---|
| CN | 203592888 U | | 5/2014 |
| CN | 104884290 A | | 9/2015 |
| EP | 2368740 A1 | | 9/2011 |
| JP | 2002-134084 | * | 5/2002 |
| JP | 2002-134084 A | | 5/2002 |
| JP | 2003-306045 A | | 10/2003 |
| JP | 2004-001683 A | | 1/2004 |
| JP | 2004-345451 A | | 12/2004 |
| JP | 2005186868 A | | 7/2005 |
| JP | 2005-205953 | * | 8/2005 |
| JP | 2005-205953 A | | 8/2005 |
| JP | 2006-335244 A | | 12/2006 |
| JP | 2008-201371 A | | 9/2008 |
| JP | 2009-272112 A | | 11/2009 |
| JP | 2010-036723 A | | 2/2010 |
| JP | 2011-31778 A | | 2/2011 |
| JP | 2012-228898 A | | 11/2012 |
| JP | 2014-125160 A | | 7/2014 |
| WO | 2011013634 A1 | | 2/2011 |

OTHER PUBLICATIONS

JP2005_205953MT.*
Communication dated May 11, 2017 from the United States Patent and Trademark Office in counterpart U.S. Appl. No. 15/031,127.
Communication dated Feb. 2, 2017 from the United States Patent and Trademark Office in counterpart U.S. Appl. No. 15/031,127.
Final Office Action dated Sep. 7, 2017 from U.S. Patent & Trademark Office in counterpart U.S. Appl. No. 15/031,127.
Communication dated Dec. 14, 2017 from the United States Patent and Trademark Office in U.S. Appl. No. 15/031,127.

* cited by examiner

BATTERY COOLING STRUCTURE

BACKGROUND OF THE INVENTION

1. Field of the Invention

The invention relates to a battery cooling structure for cooling a battery mounted in a vehicle.

2. Description of Related Art

Vehicles such as hybrid vehicles (HV) and electric vehicles (EV) run by driving a motor using electric power from a battery. Therefore, a battery that ensures the necessary electric power is mounted in the vehicle. Also, in order to improve the battery mounting space efficiency, Japanese Patent Application Publication No. 2010-036723 (JP 2010-036723 A) proposes to house the battery under a rear seat. Also, a battery generates heat as it charges and discharges. In particular, with a battery for a vehicle, large current often flows, so the amount of heat generated is large. If the temperature of the battery becomes high, the battery will deteriorate, so it is necessary to provide a structure to cool the battery. JP 2010-036723 A describes a structure that draws air into a vehicle cabin from in front of a lower portion of the rear seat, and discharges this air out of the vehicle from behind a lower portion of the rear seat.

SUMMARY OF THE INVENTION

Here, if exhaust air that has cooled the battery under the rear seat is discharged out of the vehicle as it is, the exhaust passage is able to be short, which is advantageous in terms of space, and pressure loss is low, so it is efficient. However, with this configuration, an exhaust vent is arranged in a relatively low position, so sufficient consideration must be given so that foreign matter and water and the like on the road does not get into the battery pack.

Therefore, one aspect of the invention relates to a battery cooling structure for cooling a battery mounted in a vehicle. This battery cooling structure includes a battery pack, an air supplying device, and an air exhausting device. The battery pack houses the battery in an internal space, and is arranged under a rear seat of the vehicle. The air supplying device is configured to send cooling air to the battery pack. The air exhausting device is configured to discharge exhaust air from the battery pack. An exhaust vent that discharges the exhaust air is provided in a floor surface in a rearward space behind the rear seat in the vehicle. The exhaust vent is configured to discharge the exhaust air from the battery pack upward into the rearward space from the exhaust vent.

Also, in the battery cooling structure described above, the rearward space may be a luggage space of the vehicle, and a spare tire housing space may be provided in a lower portion of the luggage space. Also, the exhaust vent may be positioned in front of the spare tire housing space.

Also, in the battery cooling structure described above, the air exhausting device may have an exhaust air duct that extends from the battery pack to the rearward space, and an exhaust port of the exhaust air duct may be provided underneath the floor surface and open into a discharge duct that extends in a vehicle width direction. The discharge duct may have a discharge port in a position planarly offset with respect to the exhaust port on a front surface side of the discharge duct. After exhaust air discharged from the exhaust port of the exhaust air duct flows through the discharge duct in a direction parallel to the floor surface in the vehicle width direction, the exhaust air may be discharged upward into the rearward space via the discharge port and the exhaust vent.

Also, in the battery cooling structure described above, the discharge port of the exhaust air duct may be covered by cloth. Also, in the battery cooling structure described above, the discharge port of the exhaust air duct may be covered by lattice. Furthermore, in the battery cooling structure described above, the discharge port of the exhaust air duct may be provided in a direction excluding in front, with respect to a vehicle longitudinal direction, of the exhaust port, and a closed portion may be provided in front, with respect to the vehicle longitudinal direction, of the exhaust port.

This kind of battery cooling structure makes it possible to effectively inhibit foreign matter and the like from getting in through the exhaust vent.

BRIEF DESCRIPTION OF THE DRAWINGS

Features, advantages, and technical and industrial, significance of exemplary embodiments of the invention will be described below with reference to the accompanying drawings, in which like numerals denote like elements, and wherein.

DETAILED DESCRIPTION OF EMBODIMENTS

Hereinafter, example embodiments of the invention will be described with reference to the accompanying drawings. The invention is not limited to the example embodiments described here.

Figure 1:
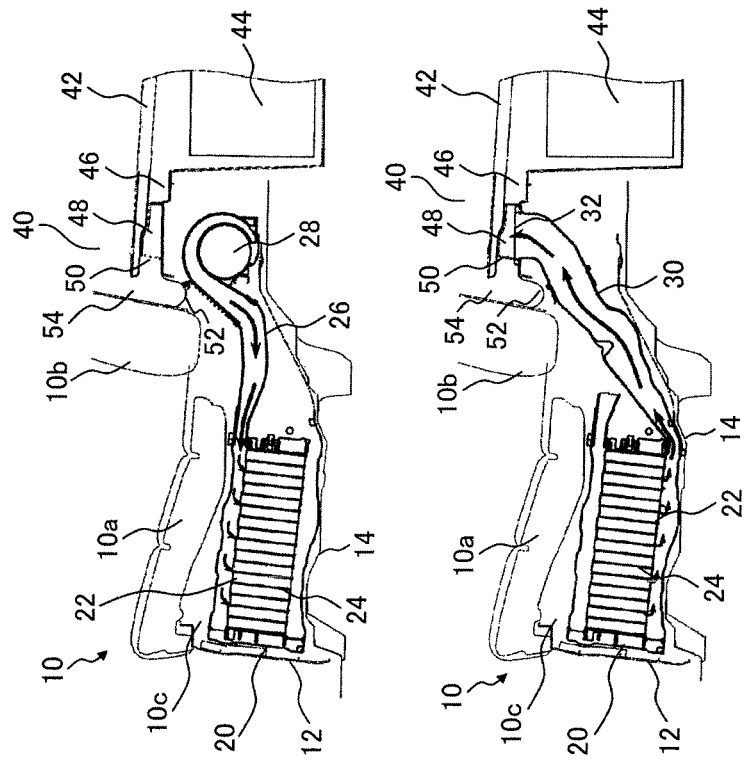
FIGS. 1A and 1B are views illustrating the flow of supply air and exhaust air to and from a battery pack according to a battery cooling structure of one example embodiment of the invention.

First, the structure related to supply air and exhaust air in a battery cooling structure of this example embodiment will be described. FIGS. 1A and 1B are views of the structure related to the flow of supply air and exhaust air to and from a battery pack in this example embodiment.

A rear seat 10 includes a seat cushion 10a, a seatback 10b, and a battery housing space 10c below the seat cushion 10a. The front and sides of the battery housing space 10c are surrounded by a lower trim 12. Also, a vehicle body 14 is positioned on a bottom surface side of the battery housing space 10c.

A battery pack 20 is arranged inside of the battery housing space 10c, and a battery stack 22 is arranged inside of this battery pack 20. This battery stack 22 is formed by a plurality of battery modules 24 connected together in series.

The inside of the battery pack 20 is sealed by a lower case and an upper cover. A supply air flow path is formed above the battery stack 22 and an exhaust air flow path is formed below the battery stack 22.

A supply air duct 26 is connected to a rear side of the supply air flow path above the battery stack 22 inside the Battery pack 20, as shown in FIG. 1A, and this supply air duct 26 extends toward the rear and is connected to a blowing side of a blower 28.

An exhaust air duct 30 is connected to a rear side of the exhaust air flow path below the battery stack 22 of the battery pack 20, as shown in FIG. 1B, and this exhaust air duct 30 extends toward the rear, with an exhaust port 32 opening upward.

A rear side (back) space of the seatback 10*b* of the rear seat 10 serves as a luggage space 40. A floor surface of the luggage space 40 is formed by a deck board 42. This deck board 42 is placed in the luggage space 40, so it is able to be picked up and removed. A spare tire space 44 within which a spare tire is housed is provide below the deck board 42, and a spare tire is housed here. Also, an accessories compartment such as a shelf is provided below the deck board 42, at a front upper portion in the spare tire space 44.

Also, the blower 28 described above is arranged behind the rear seat 10 and in front of the spare tire space 44. That is, there is a space below the luggage space 40 to the rear of the rear seat 10 and in front of the spare tire space 44, and the blower 28 is arranged here. An intake air duct 60 (see FIG. 2) and the supply air duct 26 are connected to this blower 28. Also, a rear side portion of the exhaust air duct 30 and the exhaust port 32 are provided. A discharge duct 48 that extends in a vehicle width direction is provided on an upper portion of this exhaust port 32, and a discharge port panel 50 is provided on a front surface of this discharge duct 48. This discharge port panel 50 has a closed portion and an open portion. The open portion is an exhaust port. An exhaust vent 54 formed by a gap between a tip end of the deck board 42 and a back surface of the seatback 10*b* above this exhaust port is open to the luggage space 40. A seat member 52 is provided between a lower front end of the discharge duct 48 and the back surface of the seatback 10*b* so that articles will not fall down.

Figure 2:
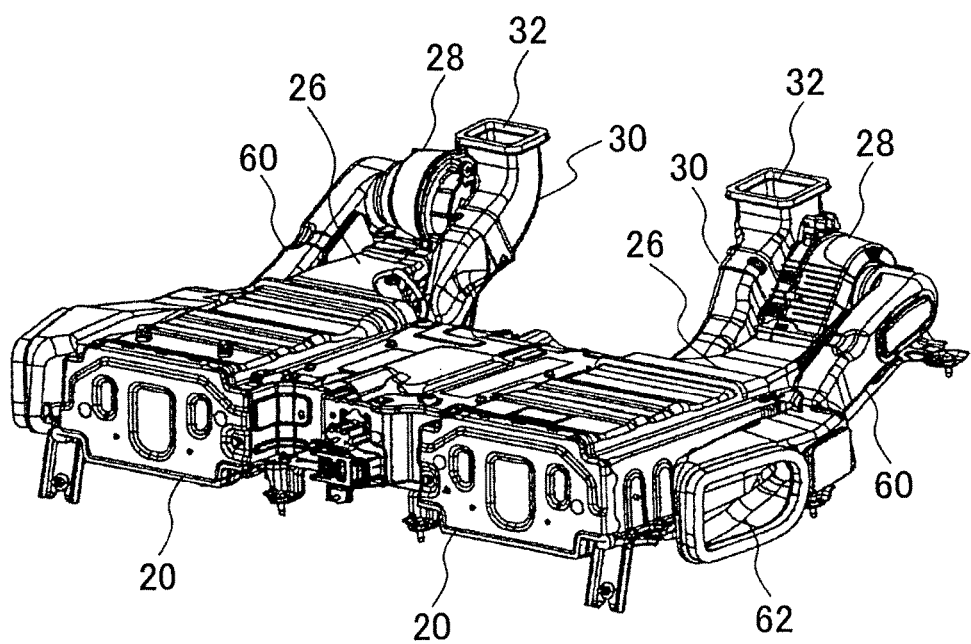
FIG. 2 is a view of the exterior of the battery pack and a duct according to the battery cooling structure of the example embodiment.

Here, FIG. 2 is a perspective view of the battery pack 20 and a duct. In this case, the intake air duct 60 is connected to the intake side of the blower 28. This intake air duct 60 draws in air from an inlet 62 in a side surface on the door side of lower trim of the rear seat 10. In FIG. 2, the seat cushion 10*a* and the lower trim 12 and the like shown in FIGS. 1A and 1B have been removed, but the inlet 62 is open to the door-side side surface of the lower trim 12. Cloth or lattice or the like is placed over the front surface of the inlet 62 to prevent foreign matter from getting in from the outside.

In this way, the intake air duct 60, the supply air duct 26, and the exhaust air duct 30 are arranged in order from the door side toward the inside, in the space below the seat cushion 10*a* of the rear seat 10.

Figure 3A:
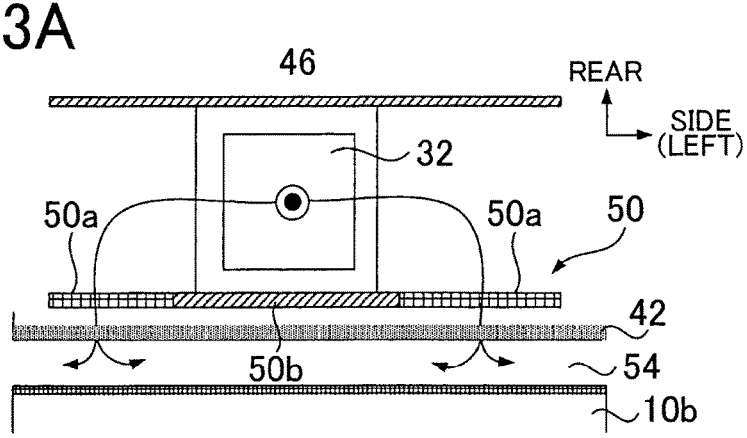
FIGS. 3A, 3B, and 3C are views of the structure of an exhaust air duct behind a rear seat according to the battery cooling structure of the example embodiment.
Figure 3B:
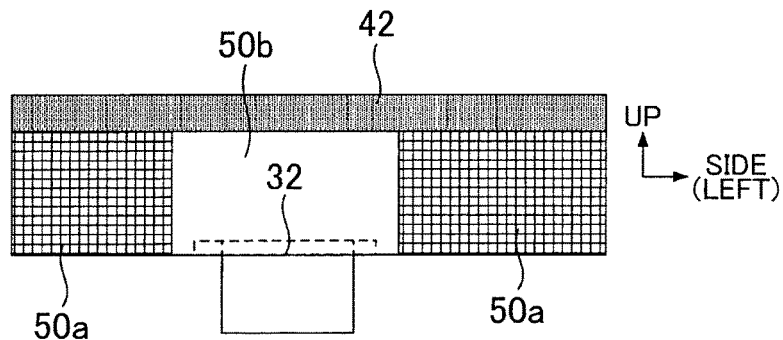
Figure 3C:
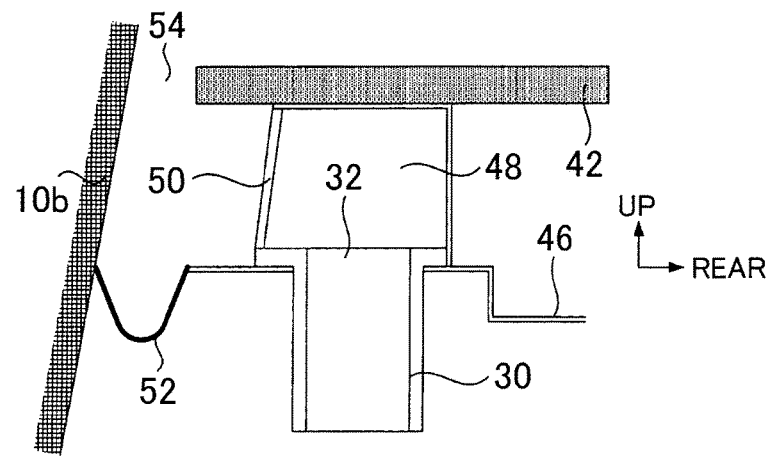

Next, the structure to the rear of the battery cooling structure of this example embodiment will be described. Here, FIGS. 3A, 3B, and 3C are views of the structure of a portion where the exhaust port 32 opens out. In FIG. 3A, the top of the drawing is toward the vehicle rear and the side of the drawing is in the vehicle width direction. In FIG. 3B, the top of the drawing is upward with respect to the vehicle, and the side of the drawing is in the vehicle width direction. In FIG. 3C, the top of the drawing is upward with respect to the vehicle, the left side of the drawing is toward the vehicle front, and the right side of the drawing is toward the vehicle rear.

In this way, the exhaust port 32 is provided in front of an accessories compartment 46, and is open to a bottom surface of the discharge duct 48 that extends in the width direction of the vehicle. This discharge duct 48 has the discharge port panel 50 on the front side. This discharge port panel 50 has a discharge port 50*a* that is covered by cloth or lattice or the like, and a closed portion 50*b*. This discharge port 50*a* is provided somewhere other than on (i.e., in a location excluding) the front side of the exhaust port 32. The front of the exhaust port 32 is the closed portion 50*b*. The discharge port panel 50 may be formed by a panel in which the discharge port 50*a* is formed as an opening, or the closed portion 50*b* may be arranged at appropriate intervals so as to form an open portion (i.e., the discharge port 50*a*) therebetween.

Therefore, after exhaust air from the exhaust port 32 temporarily curves in the width direction of the vehicle, it then flows forward toward the back surface of the seatback 10*b* of the rear seat 10. The exhaust air then passes through the exhaust vent 54 that is the gap between the tip end of the deck board 42 and the back surface of the seatback 10*b*, and is discharged upward into the luggage space 40.

Cloth or lattice may also be arranged on the upper surface of the exhaust port 32 so that articles will not fall into the exhaust port 32. Also, the discharge port panel 50 is preferably able to be removed from the discharge duct 48. Further, the upper end of the exhaust port 32 is flange-shaped and positioned above the bottom surface of the discharge duct 48. By having this portion extend upward in a pipe-shape, water and the like will not reach the exhaust port 32 even if it gets into the discharge duct 48.

Next, the flow of air in the battery cooling structure of this example embodiment will be described. Air inside the vehicle cabin is drawn in from the inlet 62 by driving the blower 28. This air is drawn into the blower 28 via the intake air duct 60. Discharged air from the blower 28 is supplied into an upper space (i.e., a supply air flow path) in the battery pack 20 via the supply air duct 26. The battery stack 22 is arranged inside the battery pack 20, but because there is a gap between battery modules 24 of the battery stack 22, the air flows downward through this gap, such that the battery modules 24 are effectively cooled. Here, cooling air is able to be made to pass through this gap between the stacked battery modules 24 by closing off the area between the periphery of the battery stack 22 and a peripheral inside wall of the battery pack 20.

Exhaust air is discharged from a lower space (i.e., an exhaust air, flow path) in the battery pack 20 into the luggage space 40 through the exhaust air duct 30, the exhaust port 32, the discharge duct 48, the discharge port panel 50, and the exhaust vent 54 that is the gap between the tip end of the deck board 42 and the back surface of the seatback 10*b*. In this example, the exhaust vent 54 is positioned along almost the entire width in the width direction of the vehicle, but it may also be limited to only a specific portion.

Next, the individual structures of the battery cooling structure of this example embodiment will be described. In FIGS. 1A and 1B, only one rear seat 10 is shown, but normally there are two rear seats 10, and battery packs 20, as well as a mechanism for cooling the battery packs 20, are arranged with the same configuration under the rear seats 10, as shown in FIGS. 1A and 1B.

Figure 4C:
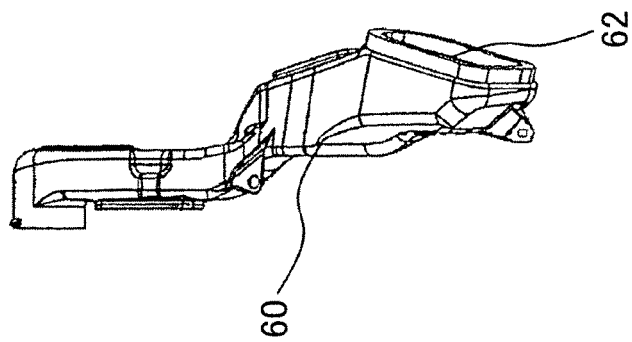
FIGS. 4A, 4B, and 4C are views of the exterior of the exhaust air duct, a supply air duct, a blower, and an intake air duct according to the battery cooling structure of the example embodiment.
Figure 4B:
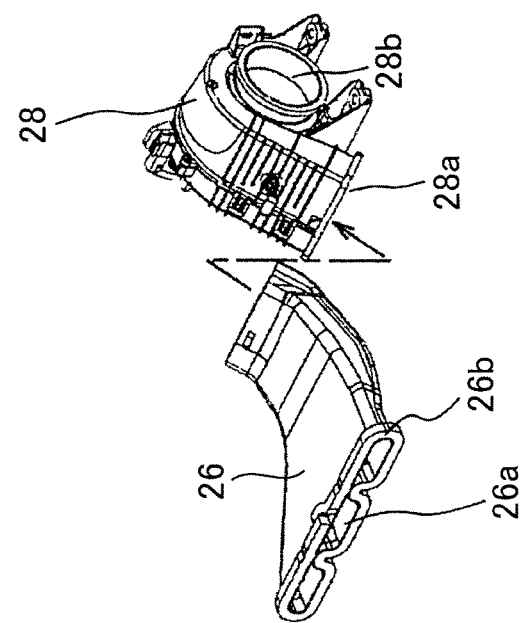
Figure 4A:
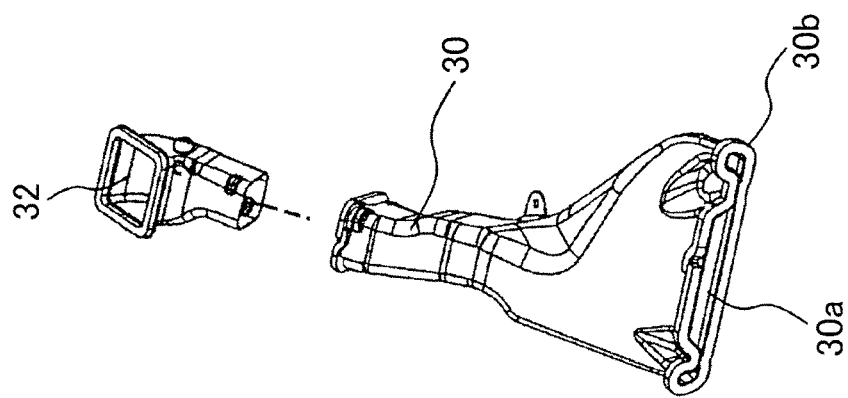

Here, FIGS. 4A, 4B, and 4C are views of the exteriors of the exhaust air duct 30, the supply air duct 26, and the intake air duct 60, respectively. As shown in FIG. 4A, the exhaust air duct 30 extends toward the rear from a rear end of a lower case that forms a bottom surface of the battery pack 20. As shown in the drawing, a front end of the exhaust air duct 30 is a flat opening that is vertically narrow (i.e., narrow in the vehicle height direction) and wide (in the vehicle width direction). Air from the whole discharge flow path below the battery stack 22 is discharged from this opening. The width of the exhaust air duct 30 gradually narrows toward the exhaust port 32, and the exhaust port 32 is a generally square-shaped opening.

Also, a periphery of an open portion 30a of the front end of the exhaust air duct 30 is reinforced by a flange portion 30b. This open portion 30a is able to be connected to the discharge flow path in an airtight manner by placing the lower side of the flange portion 30b close against the lower case and holding the upper side of the flange portion 30b down against the rear side end portion of the battery stack 22. A side portion of the flange portion 30b is connected in an airtight manner to an inside wall of an upper cover that covers a side portion and an upper portion of the battery pack 20. An airtight seal is achieved by arranging a sealant around the flange portion 30b.

A more reliable seal is achieved by providing a recessed portion that is recessed downward in two locations as shown in FIG. 4A, on an upper edge portion of the flange portion 30b, and adjusting the shape of a lower surface of the rear end of the battery stack 22 accordingly. Also, having the recessed portion directly contact the lower edge portion of the flange portion gives the flange portion 30b sufficient strength.

The front end of the supply air duct 26 is a flat open portion 26a that is vertically narrow and wide in the width direction, matching the shape of the upper space (i.e., the supply air flow path) of the battery pack 20, as shown in FIG. 4B. Also, a flange portion 26b is formed around the open portion 26a, and the periphery of this flange portion 26b is sealed via a sealant between the rear upper end portion of the battery stack 22 and the upper cover of the battery pack 20. The supply air duct 26 extends toward the rear, while the width thereof gradually becomes narrower. This supply air duct 26 is connected to an air outlet 28a around the blower 28. The blower 28 has a cylindrical shape and blows out air drawn in from a side intake port 28b in a radial direction, and blows out air from the air outlet 28a provided in a portion of a donut-shaped blowing chamber.

The intake air duct 60 has a pipe-shape that extends from the front toward the rear, and the rear end of the intake air duct 60 is connected to the intake port 28b of the blower 28, as shown in FIG. 4C. The front end is a rectangular-shaped inlet 62.

Next, the effects of the example embodiment will be described. In this way, with this example embodiment, the battery pack 20 is housed in the battery housing space 10c below the seat cushion 10a of the rear seat 10, so the battery will not get in the way of other equipment and vehicle space is able to be more efficiently utilized. Also, the discharge port 50a of the discharge duct 48 is provided right behind the back surface lower portion of the seatback 10b of the rear seat 10, so the discharge duct 48 is able to be relatively short, which enables pressure loss there to be small.

Furthermore, the exhaust port 32 opens into the discharge duct 48, the discharge duct 48 discharges exhaust air from the discharge port 50a, and the discharge port 50a is pointed in a substantially horizontal direction and is covered by cloth or the like, so foreign matter is able to be prevented from getting in from the outside. In particular, the discharge port 50a is offset from the exhaust port 32 in the width direction, so air discharged upward from the exhaust port 32 temporarily travels in the width direction of the vehicle, and then strikes the back surface of the seatback 10b from the discharge port 50a in the front surface and escapes upward. This kind of an air path makes it possible to reliably prevent foreign matter from getting in and the like. Also, the discharge port 50a is provided over a relatively large area in the vehicle width direction, so pressure loss is able to be reduced with a relatively complex path.

Exhaust air is discharged into the luggage space 40 from the opening between the deck board 42 and the back surface of the seatback 10b. Therefore, it is unlikely that this airflow will affect an occupant, so exhaust air will not cause the occupant any discomfort.

Also, the inlet 62 is on a side lower portion of the rear seat, so it is less likely that the flow of intake air from here will be felt by a leg of an occupant or the like. Moreover, the inlet 62 is pointed at an angle, so the flow of intake air is not that fast. As a result, the intake air will not easily be felt by an occupant, and noise generated by the intake air is also able to be suppressed.

The invention claimed is:

1. A battery cooling structure for cooling a battery mounted in a vehicle, the battery cooling structure comprising:
    a battery pack within which the battery is housed in an internal space, the battery pack being arranged under a rear seat of the vehicle;
    an air supplying device configured to send cooling air to the battery pack; and
    an air exhausting device configured to discharge exhaust air from the battery pack, the air exhausting device including an exhaust vent that discharges the exhaust air, the exhaust vent being provided in a floor surface in a rearward space behind the rear seat in the vehicle, and the exhaust vent being configured to discharge the exhaust air from the battery pack upward into the rearward space from the exhaust vent, wherein
    the air exhausting device has an exhaust air duct that extends from the battery pack to the rearward space, and an exhaust port of the exhaust air duct is provided underneath the floor surface and opens into a discharge duct that extends in a vehicle width direction;
    the discharge duct has a discharge port in a position planarly offset with respect to the exhaust port on a front surface side of the discharge duct; and
    after exhaust air discharged from the exhaust port of the exhaust air duct flows through the discharge duct in a direction parallel to the floor surface in the vehicle width direction, the exhaust air is discharged upward into the rearward space via the discharge port and the exhaust vent.

2. The battery cooling structure according to claim 1, wherein
    the rearward space is a luggage space of the vehicle, and a spare tire housing space is provided in a lower portion of the luggage space; and
    the exhaust vent is positioned in front of the spare tire housing space.

3. The battery cooling structure according to claim 1, wherein
    the discharge port of the exhaust air duct is covered by cloth.

4. The battery cooling structure according to claim 1, wherein
    the discharge port of the exhaust air duct is covered by lattice.

5. The battery cooling structure according to claim 1, wherein
    the discharge port of the exhaust air duct is provided in a direction excluding in front, with respect to a vehicle longitudinal direction, of the exhaust port, and a closed portion is provided in front, with respect to the vehicle longitudinal direction, of the exhaust port.

* * * * *